United States Patent
Hull

(12) United States Patent (10) Patent No.: US 7,506,583 B1
Hull (45) Date of Patent: Mar. 24, 2009

(54) FLEXOGRAPHIC PRINTING REFLECTOR

(75) Inventor: Frank A. Hull, Mound, MN (US)

(73) Assignee: Cortron Corporation, Minneapolis, MN (US)

( * ) Notice: Subject to any disclaimer, the term of this patent is extended or adjusted under 35 U.S.C. 154(b) by 744 days.

(21) Appl. No.: 10/429,177

(22) Filed: May 2, 2003

Related U.S. Application Data

(60) Provisional application No. 60/377,369, filed on May 2, 2002.

(51) Int. Cl.
   *B41M 5/00* (2006.01)
(52) U.S. Cl. .................. 101/401.1; 101/401; 101/463.1; 205/69
(58) Field of Classification Search .................. 101/401, 101/401.1, 463.1, 470, 471; 355/43, 45; 216/85, 87, 94; 205/69
See application file for complete search history.

(56) References Cited

U.S. PATENT DOCUMENTS

| | | | |
|---|---|---|---|
| 2,112,416 A * | 3/1938 | Dewberry | 430/307 |
| 4,105,330 A * | 8/1978 | Hilton | 355/102 |
| 6,114,807 A * | 9/2000 | Kavanagh | 313/570 |
| 6,115,184 A * | 9/2000 | Hubble et al. | 359/627 |
| 6,201,559 B1 * | 3/2001 | Wada et al. | 347/236 |
| 6,262,825 B1 * | 7/2001 | Mueller et al. | 359/196 |
| 6,266,163 B1 * | 7/2001 | Hirakawa | 358/475 |
| 6,567,205 B1 * | 5/2003 | Eggers et al. | 359/292 |
| 6,700,598 B1 * | 3/2004 | Hull | 347/238 |
| 6,783,349 B2 * | 8/2004 | Neavin et al. | 425/133.5 |
| 6,976,426 B2 * | 12/2005 | McLean et al. | 101/401.1 |
| 2002/0080228 A1 * | 6/2002 | Kubota et al. | 347/258 |

FOREIGN PATENT DOCUMENTS

EP 1026547 A2 * 8/2000

* cited by examiner

*Primary Examiner*—Leslie J Evanisko
*Assistant Examiner*—Matthew G Marini
(74) *Attorney, Agent, or Firm*—Kinney & Lange, P.A.

(57) ABSTRACT

A system for exposing a flexographic printing plate with light includes a light-providing subsystem and a reflector around the light-providing subsystem. The reflector includes a body and a plurality of miniature mirrors on an interior of the body arranged to reflect light generated by the light-providing subsystem to exit the reflector at angles integrated between 0 degrees and a selected angle, such as 30 degrees. As a result, the shoulder angles of features on the flexographic printing plate are controlled within a selected range of angles, such as 0 to 30 degrees.

15 Claims, 3 Drawing Sheets

FLEXOGRAPHIC PRINTING REFLECTOR

CROSS-REFERENCE TO RELATED APPLICATION(S)

This application claims the benefit of U.S. Provisional Application No. 60/377,369 filed May 2, 2003 for "Flexographic Printing Reflector" by F. Hull.

INCORPORATION BY REFERENCE

The aforementioned U.S. Provisional Application No. 60/377,369 is hereby incorporated by reference in its entirety.

BACKGROUND OF THE INVENTION

The present invention relates to a printing reflector, and more specifically to a printing reflector for producing consistent shoulders angles on features formed on a flexographic printing plate.

Flexographic printing is a direct or "relief" process, which means that ink is directly transferred from a flexographic plate to a medium, which may be paper, plastic or another suitable material. For this to happen, the print surface "feature" must protrude above the rest of the plate, which means that there must be "relief" around the feature. The low, flat smooth areas of the plate with no features are referred to as the floor. Floor exposures are short and are made through the back of the plate (up side down). Features are dots, lines or solids and all share the same optimum feature profile. Ideal features have a flat printing surface which is supported by a profile which the industry calls the "shoulder." The optimum shoulder has an angle between 20 and 30 degrees. This optimum shoulder angle provides a support base for features exposed onto the plate but is not so shallow that the features begin to lose relief between adjacent features. Too flat of a shoulder angle results in the area between the features filling in with ink during printing and/or the printed feature size being increased by "squish" which is caused when the plate is pressed against the media, known in the industry as dot gain. Too steep of a shoulder angle results in plate features that "fall over" and don't print. Adjacent features should have a cross section much like a mountain range where the shoulder of one feature comes down to meet the shoulder of the next, but there is no bridging between the features.

The flexographic plate exposure products used to date are based on two designs: (1) bank lighting which is composed of rows of fluorescent tubes positioned approx six inches from the unexposed plate, and (2) a point light source positioned approx 50 inches from the plate. The point light source design is an adaptation of a product designed to serve the lithographic plate-making process.

The advantage of bank lighting systems is even coverage, while the disadvantage is shoulders that rapidly broaden in size until reaching the base of the flexographic plate, due to the physical size of the light array. These shallow shoulder angles of the features on the plate result in a lack of printing sharpness that is undesirable. Another disadvantage is that plate features tend to point toward the nearest fluorescent tube rather than straight up.

The advantage of the point source system is steeper shoulder angles of the features on the plate compared to bank lighting systems, resulting in improved sharpness during printing. The steeper shoulder angle is the result of the effective smaller optical size of the point light source and more parallel rays because of the distance being increased from 6" to 50". Unfortunately, the increased distance results in the light rays becoming more parallel than 30 degrees and the resultant shoulder angle (feature support profile) is actually too steep. With this system the optimum feature profile is achieved by positioning a diffuser in the light path at the proper distance from the exposure plane. These diffusers are very inefficient in that they block more light than they transmit, thus producing long duration exposures. A reduction of flexographic plate exposure time is important to printers and is often a key selling point. Additionally, these long exposures caused by the use of the inefficient diffusers generate much more heat than short exposures. This is a known problem inherent with point light source exposure systems. Finally, with a point light source, there is unevenness across the image plane because the light intensity falls off around the outside edges of the plate according to the inverse square law. This is another known problem in the industry. The fact that points further from the center of the plate receive less energy causes those features to be underexposed. This type of system also suffers in quality since the plate features tend to point toward the source.

There is a need in the art for a light source exposure system that addresses the above-described problems with existing flexographic printing systems.

BRIEF SUMMARY OF THE INVENTION

The present invention is a system for exposing a flexographic printing plate with light. The system includes a light-providing subsystem and a reflector around the light-providing subsystem. The reflector includes a body and a plurality of miniature mirrors on an interior of the body arranged to reflect light generated by the light-providing subsystem to exit the reflector at angles integrated between 0 degrees and a selected angle, such as 30 degrees. As a result, the shoulder angles of features on the flexographic printing plate are controlled within a selected range of angles, such as 0 to 30 degrees.

DETAILED DESCRIPTION

Figure 1:
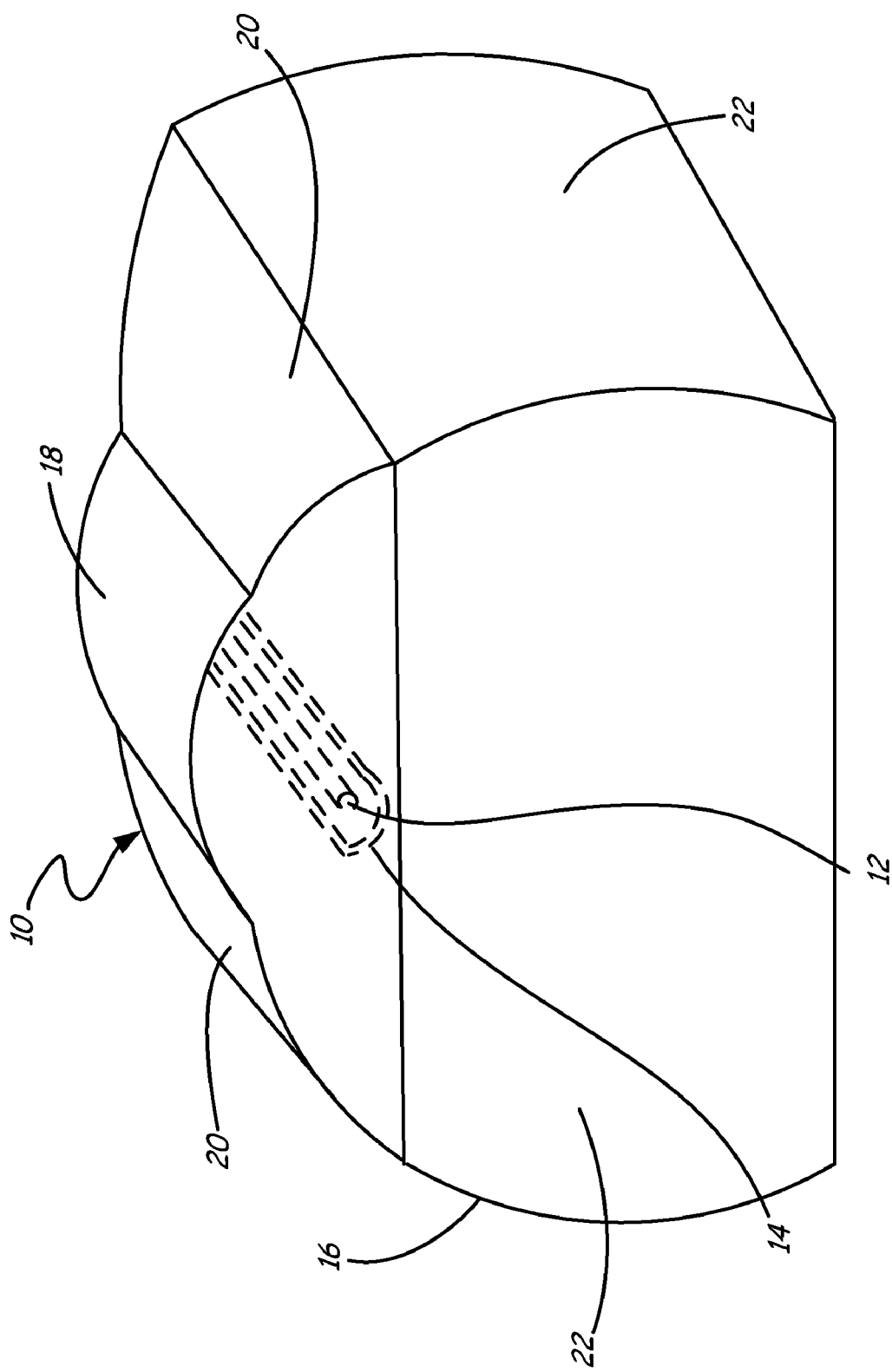
FIG. 1 is a diagram illustrating a reflector system designed according to the present invention.

FIG. 1 is a diagram illustrating reflector system 10 designed according to the present invention. A line light source, such as water cooled plasma source 12, is located adjacent to retroreflector 14, which reflects the output of light source 12 onto main reflector 16. Main reflector 16 includes cylindrical section portion 18 that is coaxial with light source 12, transitioning to conic parabolic section portions 20, which in turn transition to square cylindrical integrating sections 22. The interior surface of cylindrical section portion 18 and conic parabolic section portions 20 are stippled with miniature mirror features. The miniature mirrors convert the light radiation reflected by retroreflector 14 to uniform light radiation exiting main reflector 16 with angles well integrated between 0 and a selected angle, such as 30 degrees in an exemplary embodiment.

Figure 2:
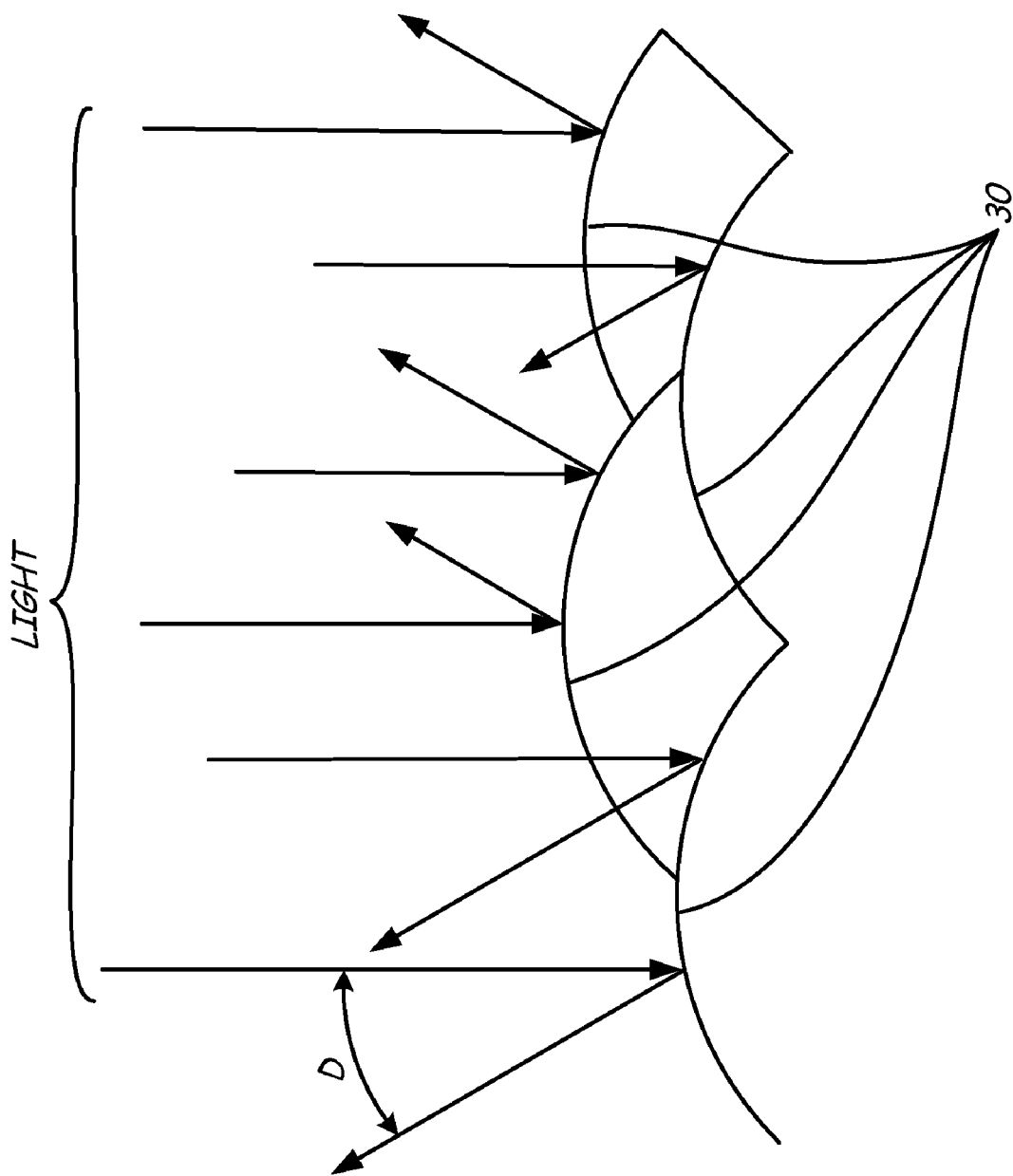
FIG. 2 is a diagram illustrating the miniature mirror pattern employed in the interior of the reflector shown in FIG. 1.

FIG. 2 is a diagram illustrating the miniature mirror pattern employed in the interior of reflector 16 shown in FIG. 1. Miniature mirror features 30 are formed by embossing in an exemplary embodiment, and are precisely configured to produce desired divergence angle D, such as 30 degrees in an exemplary embodiment. The profile of light exiting the reflector to expose the flexographic plate is tuned by the shape, size and location of miniature mirrors 30, and this profile is customized for different types of plates, processing methods, formats and exposure sources. For example, solvent-based and non-solvent based processing techniques may be employed. Flat exposure frame formats or cylinder exposure formats may be used. Analog (film-based) or digital (computer-based) exposure sources for transfer to the plate may be employed as well. The reflector mirror configuration of the present invention is advantageous for all of these types of flexographic plate and printing systems.

To further illustrate this point, consider digital flexographic plates. These plates are used for computer-to-plate exposure and have a film/carbon layer laminated to them. The digital exposure of the plates takes place in a thermal infrared (IR) computer-to-plate recorder which ablates the carbon mask in the areas to be exposed. Then the plate is moved to a high intensity exposure frame (using the reflector of the present invention) to be exposed as with any analog plate. The film/carbon mask which is laminated to the digital plate prevents oxygen from affecting the exposure, as would normally occur with analog plates. When digital plates are exposed in conventional exposure units, the feature profile tends to be too steep. The miniature mirrors of the present invention are able to be tuned in order to compensate for this effect and provide shallower shoulder angles.

Figure 3:
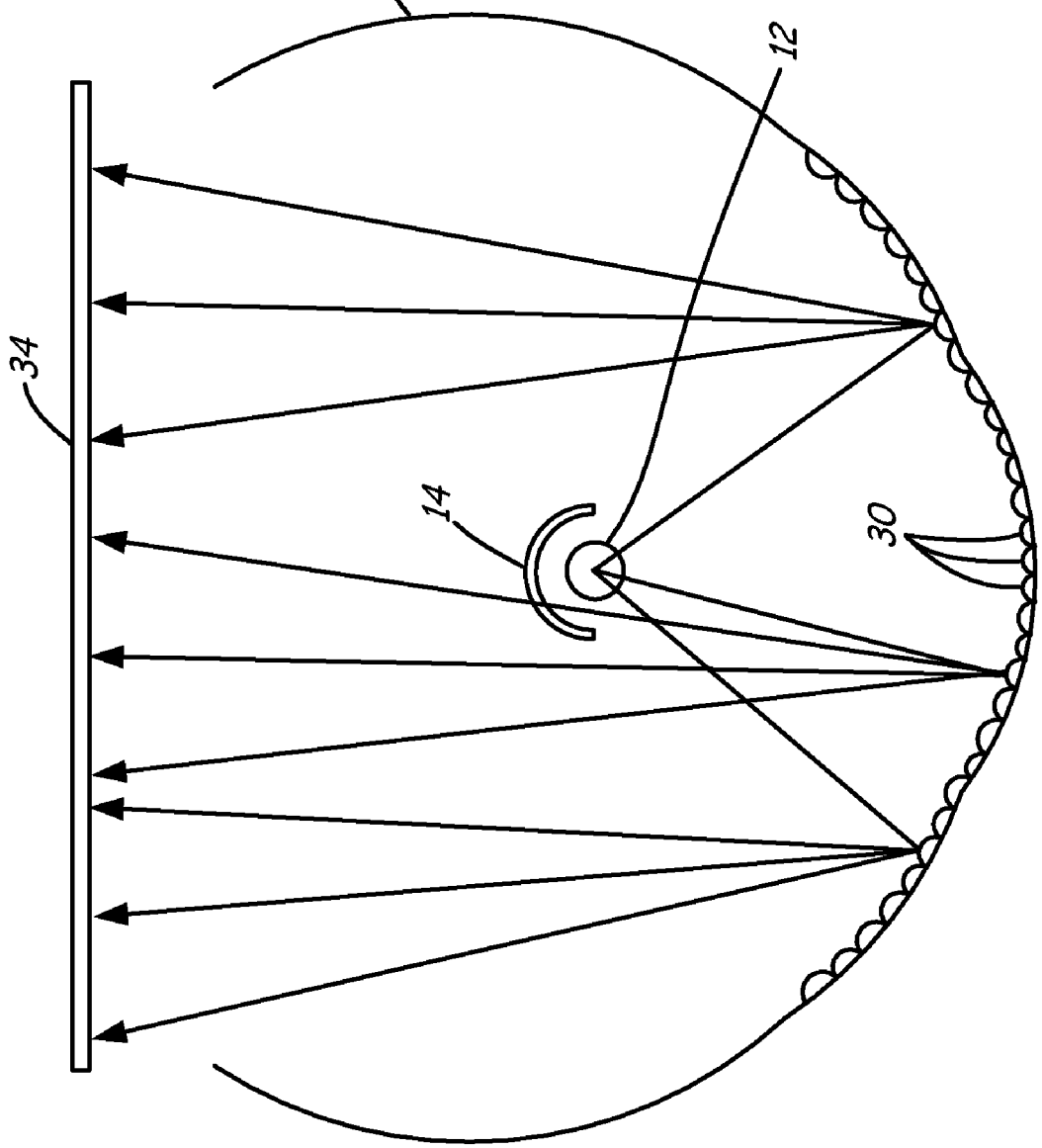
FIG. 3 is a diagram illustrating the path of light from the reflector of the present invention to expose a flexographic printing plate.

FIG. 3 is a diagram illustrating the path of light from reflector 16 of the present invention to expose flexographic printing plate 34. Light produced by line light source 12 and reflected by retroreflector 14 adjacent to light source 12 impinges on miniature mirrors 30 of main reflector 16. The light is then reflected by miniature mirrors 30 onto flexographic plate 34 at divergence angles that are well integrated between 0 and an angle such as 30 degrees at all positions on flexographic plate 34. Without the patterned miniature mirrors 34, the reflector would produce straight line (nearly collimated) rays of light, which would have too steep of a shoulder angle at flexographic plate 34. The mirror pattern distributes the light in the appropriate range of shoulder angles, such as between 0 and 30 degrees in an exemplary embodiment.

There are a number of useful features and advantages that are achievable by the present invention. Reflector system 10 can be configured to produce light output within any selected range of shoulder angles. The miniature mirror pattern of reflector 16 can be precisely controlled to produce the best angle of radiation for the particular attributes of any flexographic plate polymer type. Retroreflector 14 adjacent to light source 12 shortens the overall length of the system. Retroreflector 14 can be coated with a dichroic material that only allows useful (actinic) radiation to reach the flexographic plate, which helps to control the heat produced by the system. Light source 12 can be a very small, high brightness discharge tube that is water cooled. The small footprint of light source 12 allows the angle distribution goals to be readily achieved, and the water cooling helps to control the heat produced by the system. Water cooling can also be employed in relation to retroreflector 14 to control heat. Light source 12 can be an instant-on source which allows a very small reflector footprint and eliminates shadow because of the absence of a shutter, and also does not constantly generate heat in an idle condition.

The present invention is a novel reflector design employed with a light source in order to provide even illumination with precisely controlled divergence angles, integrated between 0 and 30 degrees in an exemplary embodiment. The reflector has an interior surface with a plurality of miniature mirror surfaces configured to produce consistent shoulders on all features of the flexographic plate regardless of their location on the plate. This reflector system is particularly advantageous for the exposure of flexographic printing plates.

Although the present invention has been described with reference to preferred embodiments, workers skilled in the art will recognize that changes may be made in form and detail without departing from the spirit and scope of the invention. For example, although the light source shown in the exemplary embodiment is a plasma line light source, it should be understood that the principles of the present invention are equally applicable for embodiments where other types of light sources are used, such as a compact arc light source for example. Other modifications and permutations will be apparent to those skilled in the art given the benefit of the teaching of the present invention.

The invention claimed is:

1. A system for exposing a flexographic printing plate with light, comprising:
   a light-providing subsystem; and
   a reflector partially surrounding the light-providing subsystem, the reflector comprising:
      a body; and
      a plurality of miniature mirrors on an interior of the body each having an arcuate shape configured and arranged to reflect light generated by the light-providing subsystem to exit the reflector at angles distributed between 0 degrees and a selected angle;
   wherein the light-providing subsystem comprises:
      a line light source; and
      a retroreflector around the line light source between the line light source and an exit of the reflector to direct light onto the reflector.

2. The system of claim 1, wherein the selected angle is 30 degrees.

3. The system of claim 1, wherein the body of the reflector comprises:
   a cylindrical section portion coaxial with the light-providing subsystem, which transitions to a conic parabolic section portion, which in turn transitions to a square integrating section.

4. The system of claim 1, wherein the line light source comprises a water cooled plasma source.

5. The system of claim 4, wherein the retroreflector is water cooled.

6. The system of claim 1, wherein the retroreflector is coated with a dichroic material to reflect only actinic radiation.

7. A method of exposing a flexographic printing plate with light, comprising:
   generating light with a line light source;
   reflecting the light from the line light source with a retroreflector away from the flexographic plate, the retroreflector being positioned around the line light source between the line light source and an exit of a reflector to direct light onto the reflector; and
   reflecting the light reflected by the retroreflector with the reflector having a plurality of arcuate miniature mirrors at divergence angles distributed between 0 degrees and a selected angle onto the flexographic printing plate.

8. The method of claim 7, wherein the selected angle is 30 degrees.

9. The method of claim 7, further comprising water cooling the line light source that generates the light.

10. The method of claim 9, further comprising water cooling the retroreflector.

11. The method of claim 7, wherein the step of reflecting the light with a retroreflector comprises reflecting only actinic radiation.

12. A method of exposing a flexographic printing plate with light, comprising:

generating light with a line light source;

reflecting the light from the line light source with a retroreflector away from the flexographic plate, the retroreflector being positioned around the line light source between the line light source and an exit of a reflector to direct light onto the reflector; and reflecting the light reflected by the retroreflector with the reflector having a plurality of arcuate miniature mirrors at divergence angles selected to create features on the flexographic printing plate having shoulder angles distributed within a controlled range of 0 to 30 degrees across the entire flexographic printing plate.

13. The method of claim 12, further comprising water cooling the line light source that generates the light.

14. The method of claim 13, further comprising water cooling the retroreflector.

15. The method of claim 12, wherein the step of reflecting the light with a retroreflector comprises reflecting only actinic radiation.

\* \* \* \* \*